(12) United States Patent
Wei et al.

(10) Patent No.: US 8,422,544 B2
(45) Date of Patent: *Apr. 16, 2013

(54) COMMUNICATION RECEIVER WITH AN ADAPTIVE EQUALIZER

(75) Inventors: Yongbin Wei, San Diego, CA (US); Durga Prasad Malladi, San Diego, CA (US); Josef Blanz, Wachenheim (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/856,678

(22) Filed: Sep. 17, 2007

(65) Prior Publication Data
US 2008/0002763 A1    Jan. 3, 2008

Related U.S. Application Data

(63) Continuation of application No. 10/368,920, filed on Feb. 18, 2003, now Pat. No. 7,272,176.

(51) Int. Cl.
*H03H 7/30* (2006.01)

(52) U.S. Cl.
USPC .......................................................... 375/232

(58) Field of Classification Search .................. 375/229, 375/230, 232, 233, 316, 346
See application file for complete search history.

(56) References Cited

U.S. PATENT DOCUMENTS

| | | |
|---|---|---|
| 5,101,501 A | 3/1992 | Gilhousen et al. |
| 5,267,264 A | 11/1993 | Shlenker et al. |
| 5,278,835 A | 1/1994 | Ito |
| 5,297,165 A | 3/1994 | Ueda et al. |
| 5,327,459 A | 7/1994 | Hara et al. |
| 5,402,496 A | 3/1995 | Soli et al. |
| 5,572,552 A | 11/1996 | Dent et al. |
| 5,636,244 A | 6/1997 | Goodson et al. |
| 5,648,983 A | 7/1997 | Kostic et al. |

(Continued)

FOREIGN PATENT DOCUMENTS

| | | |
|---|---|---|
| EP | 0615347 A1 | 9/1994 |
| EP | 1014609 A1 | 6/2000 |

(Continued)

OTHER PUBLICATIONS

Heikkila, M. J. et al., "Interference suppression in CDMA downlink through adaptive channel equalization" Vehicular Technology Conference, 1999. VTC 1999—Fall. IEEE VTS 50th Amsterdam Netherlands Sep. 19-22, 1999, Piscataway, NJ, USA, IEEE, US, pp. 978-982.

(Continued)

*Primary Examiner* — Kevin M Burd
(74) *Attorney, Agent, or Firm* — Jonathan Velasco; Jeffrey D. Jacobs (57) ABSTRACT

In a wireless communication system, a method for estimating a transmitted signal is disclosed. A wireless signal is received that includes a pilot channel and at least one other channel. A transmitted signal is estimated using an equalizer and the received wireless signal. The equalizer includes a filter with a plurality of taps that are adapted through use of an adaptive algorithm that uses an estimated pilot estimated from the received wireless signal. The pilot channel is transmitted in the wireless signal that included the at least one other channel. The estimated pilot is extracted and provided to the adaptive algorithm.

29 Claims, 8 Drawing Sheets

U.S. PATENT DOCUMENTS

| | | | |
|---|---|---|---|
| 5,689,528 A | 11/1997 | Tsujimoto | |
| 5,694,388 A | 12/1997 | Sawahashi | |
| 5,751,768 A * | 5/1998 | Guglielmi et al. | 375/234 |
| 5,872,775 A | 2/1999 | Saints et al. | |
| 5,909,640 A | 6/1999 | Farrer et al. | |
| 5,956,371 A | 9/1999 | Yamane | |
| 6,018,544 A | 1/2000 | Kotzin et al. | |
| 6,075,808 A | 6/2000 | Tsujimoto | |
| 6,097,763 A | 8/2000 | Djokovic et al. | |
| 6,122,015 A | 9/2000 | Al-Dhahir et al. | |
| 6,175,581 B1 | 1/2001 | Sato | |
| 6,175,588 B1 * | 1/2001 | Visotsky et al. | 375/148 |
| 6,240,129 B1 * | 5/2001 | Reusens et al. | 375/222 |
| 6,351,462 B1 | 2/2002 | Komatsu | |
| 6,421,369 B1 | 7/2002 | Iwaskai et al. | |
| 6,466,616 B1 | 10/2002 | Stenstrom et al. | |
| 6,470,044 B1 | 10/2002 | Kowalski | |
| 6,496,706 B1 | 12/2002 | Jou et al. | |
| 6,526,093 B1 | 2/2003 | Bao et al. | |
| 6,574,269 B1 | 6/2003 | Bergamo | |
| 6,577,690 B1 * | 6/2003 | Barman et al. | 375/354 |
| 6,603,827 B2 | 8/2003 | Bottomley et al. | |
| 6,625,197 B1 | 9/2003 | Lundby et al. | |
| 6,628,707 B2 | 9/2003 | Rafie et al. | |
| 6,731,622 B1 | 5/2004 | Frank et al. | |
| 6,744,754 B1 | 6/2004 | Lee | |
| 6,816,541 B1 | 11/2004 | Schmidl | |
| 6,856,610 B2 | 2/2005 | Schmidl et al. | |
| 6,879,577 B2 | 4/2005 | Lee | |
| 6,907,064 B1 * | 6/2005 | Tokunaga et al. | 375/232 |
| 6,990,158 B2 | 1/2006 | Shan et al. | |
| 7,010,316 B2 | 3/2006 | Chen | |
| 7,013,111 B2 | 3/2006 | Kuwahara et al. | |
| 7,020,212 B1 | 3/2006 | Strait | |
| 7,023,265 B1 | 4/2006 | Helard et al. | |
| 7,050,419 B2 | 5/2006 | Azenkot et al. | |
| 7,061,067 B2 | 6/2006 | Tanaka et al. | |
| 7,061,967 B2 | 6/2006 | Schelm et al. | |
| 7,068,742 B2 | 6/2006 | Yousef et al. | |
| 7,085,317 B2 | 8/2006 | Malladi et al. | |
| 7,092,431 B2 | 8/2006 | Maeda et al. | |
| 7,103,375 B2 | 9/2006 | Garmonov et al. | |
| 7,116,957 B2 | 10/2006 | Sih et al. | |
| 7,158,558 B2 | 1/2007 | Petre et al. | |
| 7,161,973 B2 | 1/2007 | Ghosh | |
| 7,167,506 B2 | 1/2007 | Baltersee et al. | |
| 7,177,348 B2 | 2/2007 | Yang | |
| 7,193,983 B2 | 3/2007 | Liang et al. | |
| 7,203,232 B2 | 4/2007 | Ahn | |
| 7,257,377 B2 | 8/2007 | Malladi et al. | |
| 7,272,176 B2 * | 9/2007 | Wei et al. | 375/232 |
| 7,356,074 B2 | 4/2008 | Shan | |
| 7,356,100 B2 | 4/2008 | Molisch et al. | |
| 7,403,557 B2 | 7/2008 | Pan et al. | |
| 7,454,181 B2 | 11/2008 | Banister et al. | |
| 7,477,677 B2 | 1/2009 | Lundby et al. | |
| 7,609,754 B2 | 10/2009 | Fulghum | |
| 7,630,321 B2 | 12/2009 | Jain et al. | |
| 7,676,240 B2 | 3/2010 | Rudrapatna | |
| 8,102,795 B2 | 1/2012 | Sambhwani et al. | |
| 2002/0012383 A1 * | 1/2002 | Higuchi et al. | 375/141 |
| 2002/0027952 A1 | 3/2002 | Kokuryo et al. | |
| 2002/0077953 A1 | 6/2002 | Dutta | |
| 2002/0159505 A1 | 10/2002 | Hayashibara | |
| 2003/0035469 A1 | 2/2003 | Frank et al. | |
| 2003/0053571 A1 | 3/2003 | Belotserkovsky et al. | |
| 2004/0001539 A1 | 1/2004 | Sankaran et al. | |
| 2004/0017846 A1 | 1/2004 | Fernandez-Corbaton et al. | |
| 2004/0151269 A1 * | 8/2004 | Balakrishnan et al. | 375/355 |
| 2004/0161057 A1 | 8/2004 | Malladi et al. | |
| 2004/0203812 A1 | 10/2004 | Malladi et al. | |
| 2007/0202824 A1 | 8/2007 | Malladi et al. | |
| 2011/0013686 A1 | 1/2011 | Malladi et al. | |

FOREIGN PATENT DOCUMENTS

| | | |
|---|---|---|
| EP | 1130792 | 9/2001 |
| EP | 1182836 | 2/2002 |
| JP | 04018808 | 1/1992 |
| JP | 4230112 A | 8/1992 |
| JP | 5207076 A | 8/1993 |
| JP | 10028080 A | 1/1998 |
| JP | 11205209 A | 7/1999 |
| JP | 11266232 A | 9/1999 |
| JP | 2000049666 A | 2/2000 |
| JP | 2000092009 A | 3/2000 |
| JP | 2000224077 A | 8/2000 |
| JP | 2001177451 | 6/2001 |
| JP | 2001257627 A | 9/2001 |
| JP | 2001339326 A | 12/2001 |
| JP | 2002026780 A | 1/2002 |
| JP | 2002084332 A | 3/2002 |
| JP | 2002158722 A | 5/2002 |
| JP | 2003503959 A | 1/2003 |
| JP | 2003046415 A | 2/2003 |
| RU | 97107847 | 5/1999 |
| RU | 2153776 | 7/2000 |
| RU | 2192709 C2 | 11/2002 |
| WO | 8907860 | 8/1989 |
| WO | 9407311 A1 | 3/1994 |
| WO | 9845955 | 10/1998 |
| WO | WO0041338 A1 | 7/2000 |
| WO | 0054418 | 9/2000 |
| WO | WO0067389 A1 | 11/2000 |
| WO | WO0103393 A1 | 1/2001 |
| WO | WO0120840 A1 | 3/2001 |
| WO | 0152468 | 7/2001 |
| WO | WO0173983 A1 | 10/2001 |
| WO | WO02009305 A2 | 1/2002 |
| WO | WO02080379 A2 | 10/2002 |

OTHER PUBLICATIONS

"ETSI TS 125 211 v5.3.0; ""Universal Mobile Telecommunications System (UMTS); Physical channels and mapping of transport channels onto physical channels (FDD)""", Release 5 (Dec. 2002)."

"ETSI TS 125 212 v5.3.0; ""Universal Mobile Telecommunications System (UMTS); Multiplexing and channel coding (FDD)"", 3G TS 25.212 version 5.3,0 Release 5 (Dec. 2002)".

"ETSI TS 125 213 v5.3.0; ""Universal Mobile Telecommunications System (UMTS); Spreading and modulation (FDD)"", 3G TS 25.213 version5.3.0 Release 5 (Mar. 2003)".

"ETSI TS 125 214 v5.3.0; ""Universal Mobile Telecommunications System (UMTS); Physical layer procedures (FDD)"", 3G TS 25.214 version 5.3.0 Release 5 (Dec. 2002)".

International Search Report, PCT/US04/004706, International Search Authority, European Patent Office, Jul. 26, 2004.

Proakis J, "Spread Spectrum Signals for the Digital Communications," Digital Communications, Ch. 13, Nov. 28, 2000, pp. 749,751,842-848, 851-852.

ETSI TS 125 211 v5.6.0; "Universal Mobile Telecommunications System (UMTS); Physical channels and mapping of transport channels onto physical channels (FDD)", 3GPP TS 25.211 version 5.1.0 Release 5 (Sep. 2004).

ETSI TS 125 212 v6.2.0; "Universal Mobile Telecommunications System (UMTS); Multiplexing and channel coding (FDD)", 3G TS 25.212 version 6.2.0 Release 5 (Jun. 2004).

ETSI TS 125 213 v6.0.0; "Universal Mobile Telecommunications System (UMTS); Spreading and modulation (FDD)", 3G TS 25.213 version 6.0.0 Release 5 (Dec. 2003).

ETSI TS 125 214 v6.3.0; "Universal Mobile Telecommunications System (UMTS); Physical layer procedures (FDD)", 3G TS 25.214 version 6.3.0 Release 5 (Sep. 2004).

ETSI TS 125 302 v5.3.0; "Universal Mobile Telecommunications System (UMTS); Services Provided by the Physical Layer", 3GPP TS 25.302 v5.3.0 Release 5 (Dec. 2002).

TIA/EIA/IS-856-A, "cdma2000 High Rate Packet Data Air Interface Specification".

TIA/EIA/IS-95-A; "Mobile Station—Base Station Compatibility Standard for Dual-Mode Wideband Spread Spectrum Cellular System".

3GPP2 C.S0024-A, "cdma2000 High Rate Packet Data Air Interface Specification," Version 1.0, Mar. 2004.

ETSI TS 125 213 v5.2.0; "3rd Generation Partnership Project Technical Specification Group Radio Access Network Spreading and modulation (FDD)" Release 5 (Sep. 2002).

TIA/EIA/IS-95-A; "Mobile Station—Base Station Compatibility Standard for Dual-Mode Wideband Spread Spectrum Cellular System", 1995.

Written Opinion, PCT/US04/004706, International Search Authority, European Patent Office, Jul. 26, 2004.

Gregory E Bottomley G. et al: "A Generalized RAKE Receiver for Interference Suppression" IEEE Journal on Selected Areas in Communications, IEEE Service Center, Piscataway, US, vol. 18, No. 8, Aug. 1, 2000, XP0110551761SSN: 0733-8716, pp. 1536-1545.

Markku J. Heikkila et al., Interference Suppression in CDMA Downlink through Adaptive Channel Equalization, Vehicular Technology Conference 1999 VTC 1999-Fall IEEE VTS 50th, 1999, pp. 978-982.

Ylitalo J: "Channel estimation study of CDMA downlink for fixed beam BTS" Personal, Indoor and Mobile Radio Communications, 2002. The 13th IEEE International Symposium on Sep. 15-18, 2002, Piscataway, NJ, USA, IEEE, vol. 1, pp. 242-246, XP010614223 ISBN: 9780-7803-7589-5.

John Proakis, Digital Communications, Chapter Thirteen: "Spread Spectrum Signals for Digital Communications," Nov. 28, 2000, pp. 749-751, 842-848, 851-852.

Engineers, Apr. 4, 1998, vol. J81-A, No. 4, pp. 622-630.

TIA/EIA/-95-B; "Mobile Station-Base Station Compatibility Standard for Dual-Mode Wideband Spread Spectrum Cellular System", Mar. 1999.

TIA/EIA/IS-95-A, "cdma2000 High Rate Packet Data Air Interface Specification", Jul. 1998.

TIA/EIA-95-A; "Mobile Station-Base Station Compatibility Standard for Dual-Mode Wideband Spread Spectrum Cellular System", May 1995.

Proakis J, "Spread Spectrum Signals for the Digital Communications," Digital Communications Moscow, Radio I svyaz, Nov. 28, 2000, pp. 502, 546-548.

John Proakis, Digital Communications, Chapter Thirteen: "Spread Spectrum Signals for Digital Communications," Nov. 28, 2000, pp. 749-751, 842-845, 851-852.

Jouji Suzuki at al.,"Adaptation of Butler-Cantoni Method for Fast Start-Up Equalization,"Transaction A of the Institute of Electronics, Information and Communication.

Engineers, Apr. 1998, vol. J81-A, No. 4, pp. 622-630.

Partial Translation of Reference 1, Wireless Trivia (10), Published Sep. 21, 2012, URL: http://www.wirelessdesign.biz/details3022.html.

* cited by examiner

COMMUNICATION RECEIVER WITH AN ADAPTIVE EQUALIZER

RELATED APPLICATION

The present Application for patent is a continuation of and claims priority to U.S. Ser. No. 10/368,920, entitled "COMMUNICATION RECEIVER WITH AN ADAPTIVE EQUALIZER," filed Feb. 18, 2003, assigned to the assignee hereof, and expressly incorporated herein by reference.

REFERENCE TO CO-PENDING APPLICATIONS FOR PATENT

The present Application for patent is related to the following co-pending U.S. patent applications:

"Communication Receiver with an Adaptive Equalizer Length" by Durga Malladi, Josef Blanz and Yongbin Wei, assigned U.S. Pat. No. 7,085,317, issued Aug. 1, 2006, assigned to the assignee hereof, and expressly incorporated by reference herein;

"Communication Receiver with an Adaptive Equalizer That Uses Channel Estimation" by Durga Malladi, Josef Blanz and Yongbin Wei, assigned U.S. patent application Ser. No. 10/368,891, filed Feb. 18, 2003, assigned to the assignee hereof, and expressly incorporated by reference herein;

"Communication Receiver with a Rake-Based Adaptive Equalizer" by Durga Malladi, Josef Blanz and Yongbin Wei, assigned U.S. patent application Ser. No. 10/368,892, filed Feb. 18, 2003, assigned to the assignee hereof, and expressly incorporated by reference herein; and "Systems And Methods For Improving Channel Estimation" by Durga Malladi, Josef Blanz and Yongbin Wei, assigned U.S. patent application Ser. No. 10/368,765, filed Feb. 18, 2003, assigned to the assignee hereof, and expressly incorporated by reference herein.

TECHNICAL FIELD

The present invention relates generally to equalization in communications systems, and more specifically, to an adaptive equalizer for use with wireless communication systems.

BACKGROUND

Communications systems are used for transmission of information from one device to another. Prior to transmission, information is encoded into a format suitable for transmission over a communication channel. The transmitted signal is distorted as it travels through the communication channel; the signal also experiences degradation from noise and interference picked up during transmission.

One effect that creates signal distortion is multipath propagation. Multipath signals are different versions of the same wireless signal that are generated by reflections from structures and natural formations. Multipath signals may have phase shifts that cause the signals to cancel each other out at certain locations. The loss of a signal due to the phase cancellation of multipath signals is known as fading. Fading is a problem in wireless systems because it disrupts user communications. For example, several multipath copies of a single wireless signal transmitted by a wireless communications device may be generated by reflections from trees and buildings. These multipath copies may combine and cancel each other out due to phase offset.

Another issue that may affect a signal is an inadequate signal-to-noise ratio. The signal-to-noise ratio ("SNR") represents the power of a signal relative to the surrounding noise. An adequate SNR needs to be maintained so that the signal may be separated from the noise.

An example of interference commonly encountered in bandlimited channels is called inter-symbol interference (ISI). ISI occurs as a result of the spreading of a transmitted symbol pulse due to the dispersive nature of the channel, which results in an overlap of adjacent symbol pulses. The dispersive nature of the channel is a consequence of multipath propagation. The received signal is decoded and translated into the original pre-encoded form. Both the transmitter and receiver are designed to minimize the effects of channel imperfections and interference.

Various receiver designs may be implemented to compensate for noise and interference caused by the transmitter and the channel. By way of example, an equalizer is a common choice for dealing with multipath, ISI and for improving the SNR. An equalizer corrects for distortions and generates an estimate of the transmitted symbol. In the wireless environment, equalizers are required to handle time-varying channel conditions. Ideally, the response of the equalizer adjusts to changes in channel characteristics. The ability of the equalizer to respond to changing conditions is related to the adaptation capabilities of the equalizer. Optimizing the equalizer by designing an efficient and effective adaptation algorithm is difficult, as this requires a balancing of competing goals.

A need exists, therefore, for an equalizer design that optimizes performance for a variety of systems and conditions.

DETAILED DESCRIPTION

In a wireless communication system, a method for estimating a transmitted signal is disclosed. A wireless signal is received that includes a pilot channel and at least one other channel. A transmitted signal is estimated using an equalizer and the received wireless signal. The equalizer includes a filter with a plurality of taps that are adapted through use of an adaptive algorithm that uses an estimated pilot estimated from the received wireless signal. The pilot channel is transmitted in the wireless signal that included the at least one other channel. The estimated pilot is extracted and provided to the adaptive algorithm.

Various algorithms may be used for the adaptive algorithm. For example, an iterative algorithm may be used.

The method may be implemented in a variety of communication receivers. For example, the method may be implemented in a mobile station. The wireless signal may include orthogonal and non-orthogonal channels. The method may also be implemented by a base station.

A digital filter may be used to implement the equalizer. One possible digital filter that may be used is a FIR filter. An IIR filter may also be used. In addition, the filtering may be performed in the frequency domain.

Different adapting criteria may be used with the adaptive algorithm. In one embodiment the adaptive algorithm may be used once every pilot symbol interval to update the taps. The adaptive algorithm may be used N times every pilot symbol interval to update the taps, where N is any positive integer. In another embodiment the adaptive algorithm may be used once every $N^{th}$ pilot symbol interval to update the taps, where N is any positive integer. The adaptive algorithm may continue to adapt new tap values until the new tap values converge, or it may continue to adapt for a time period. The adaptive algorithm may perform adaptation when channel conditions have changed such that the equalizer does not match current channel conditions.

A mobile station for use in a wireless communication system is also disclosed. The mobile station includes an adaptive equalizer for estimating a transmitted signal. The mobile station includes at least one antenna for receiving a wireless signal and a receiver in electronic communication with the at least one antenna. An equalizer estimates a transmitted signal. The equalizer includes a filter with a plurality of taps that are adapted through use of an adaptive algorithm that uses an estimated pilot estimated from the received wireless signal. The pilot channel is transmitted with the at least one other channel. The mobile station also includes a component to extract the estimated pilot and to provide the estimated pilot to the adaptive algorithm.

The components of the mobile station are also applicable and may be used with other receiving systems. An apparatus is also generally disclosed for use in a wireless communication system that includes an adaptive equalizer for estimating a transmitted signal. The apparatus may be embodied in a mobile station, in a base station, or in any other system that needs to receive and process a wireless signal.

The systems and methods disclosed herein may be used to compensate for multipath propagation. Multipath signals are different versions of the same wireless signal that are generated by reflections from structures and natural formations. Multipath signals may have phase shifts that cause the signals to cancel each other out at certain locations. The loss of a signal due to the phase cancellation of multipath signals is known as fading. Fading is a problem in wireless systems because it disrupts user communications. For example, several multipath copies of a single wireless signal transmitted by a wireless communications device may be generated by reflections from trees and buildings. These multipath copies may combine and cancel each other out due to phase offset.

The systems and methods disclosed herein may also be helpful in optimizing the power used in a communication system. CDMA systems benefit from using power control. The signal-to-noise ratio ("SNR") represents the power of a signal relative to the surrounding noise. An adequate SNR must be maintained so that the signal may be separated from the noise. Since CDMA signals are not divided by frequency or time for a given link direction, the noise component of the ratio includes all other received CDMA signals. If the power of an individual CDMA signal is too high, it effectively drowns out all other CDMA signals. Power control is used on the uplink (transmission from the terminal to the base station) and on the downlink (transmission from the base station to the terminal). On the uplink, power control is used to maintain an appropriate power level for all user signals received at the base station. The power level of these received CDMA signals should be minimized, but still must be strong enough to maintain the appropriate SNR. On the downlink, power control is used to maintain an appropriate power level for all signals received at the various terminals. This minimizes interference between users in the same cell due to multipath signals. This also minimizes interference between users in adjacent cells. CDMA systems dynamically control the transmit power of the base station and the terminals to maintain the appropriate power level on the uplink and the downlink. Dynamic control is applied through open loop and closed loop control techniques that are known in the industry.

The range of the CDMA system is directly related to the common power level of the received signals because each additional signal adds noise to all of the other signals. The user noise component of the SNR is reduced when the average receive power level is lowered. Techniques that decrease CDMA signal power from the communications device directly increase the range of the CDMA system. Receive diversity is one technique used to minimize the required signal power. Lower signal power also lowers the cost of the user communications devices while increasing operational battery life as well as the range. Optimizing the power used may have additional benefits in high data rate systems where high data rates might only be supported if an appropriate SNR may be reached.

Communications systems are used for transmission of information from one device to another. Before transmission, information is encoded into a format suitable for transmission over a communication channel. The communication channel may be a transmission line or free space between the transmitter and the receiver. As the signal propagates through the channel, the transmitted signal is distorted by imperfections in the channel. Furthermore, the signal experiences degradation from noise and interference picked up during transmission. An example of interference commonly encountered in bandlimited channels is called inter-symbol interference (ISI). ISI occurs as a result of the spreading of a transmitted symbol pulse due to the dispersive nature of the channel, which results in an overlap of adjacent symbol pulses. The dispersive nature of the channel is a consequence of multipath propagation. At the receiver, the signal is processed and translated into the original pre-encoded form. Both the transmitter and receiver are designed to minimize the effects of channel imperfections and interference.

Various receiver designs may be implemented to compensate for interference and noise caused by the transmitter and the channel. By way of example, an equalizer is a common choice for dealing with these problems. An equalizer may be implemented with a transversal filter, i.e. a delay line with T-second taps (where T is the time resolution of the equalizer filter). The contents of the taps are weighted and summed to generate an estimate of the transmitted signal. The tap coefficients are adjusted to compensate for changes in the radio channel. Commonly, an adaptive equalization technique is employed whereby the tap coefficients are continually and automatically adjusted. The adaptive equalizer uses a prescribed algorithm, such as Least Mean Square (LMS) or Recursive Least Squares (RLS), to determine the tap coefficients. The signal estimate is coupled to a channel separation device such as a descrambler/despreader and to a decision-making device such as a decoder or a symbol slicer.

The ability of a receiver to detect a signal in the presence of noise is based on the ratio of the received signal power and the noise power, commonly known as the SNR or the carrier-to-interference ratio (C/I). Industry usage of these terms, or similar terms, is often interchangeable, however, the meaning is the same. Accordingly, any reference to C/I herein will be understood by those skilled in the art to encompass the broad concept of measuring the effects of noise at various points in the communications system.

Equalizers in wireless communication systems are designed to adjust to time-varying channel conditions. As the channel characteristics change, the equalizer adjusts its response accordingly. Such changes may include variations in the propagation medium or the relative motion of the transmitter and receiver, as well as other conditions. As discussed hereinabove, adaptive filtering algorithms are often used to modify the equalizer tap coefficients. Equalizers that employ adaptive algorithms are generally referred to as adaptive equalizers.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The following discussion develops embodiments of a communication receiver with an adaptive equalizer by first discussing a spread-spectrum wireless communication system. A base station and a mobile station, as well as the communications sent there between, are then discussed. Then components of an embodiment of a subscriber unit are shown. Functional block diagrams are shown and described in relation to the transmission and reception of a wireless signal. Details regarding an equalizer and an adaptive algorithm in the receiving system are also set forth. Included in the specification relating to the signal processing are illustrations and mathematical derivations. The process for using the equalizer and adapting the internal components of the equalizer is then discussed.

Alternate embodiments may incorporate various aspects without departing from the scope of the present invention. Specifically, the present invention is applicable to a data processing system, a wireless communication system, a mobile IP network and any other system desiring to receive and process a wireless signal.

The illustrated embodiment employs a spread-spectrum wireless communication system. Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3GPP TS 25.211, 3GPP TS 25.212, 3GPP TS 25.213, and 3GPP TS 25.214, 3GPP TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC.

Each standard specifically defines the processing of data for transmission from base station to mobile, and vice versa. The following discussion considers a spread-spectrum communication system consistent with the cdma2000 standard of protocols. Alternate embodiments may incorporate another standard.

The systems and methods described herein may be used with high data rate communication systems. Throughout the following discussion a specific high data rate system is described for clarity. Alternate systems may be implemented that provide transmission of information at high data rates. For CDMA communications systems designed to transmit at higher data rates, such as a High Data Rate (HDR) communications system, a variable data rate request scheme may be used to communicate at the maximum data rate that the C/I may support. The HDR communications system is typically designed to conform to one or more standards such as the "cdma2000 High Rate Packet Data Air Interface Specification," 3GPP2 C.S0024, Version 2, Oct. 27, 2000, promulgated by the consortium "$3^{rd}$ Generation Partnership Project 2."

A receiver in a HDR communications system may employ a variable rate data request scheme. The receiver may be embodied in a subscriber station in communication with a land-based data network by transmitting data on an uplink to a base station (shown below). The base station receives the data and routes the data through a base station controller (BSC) (not shown) to the land-based network. Conversely, communications to the subscriber station may be routed from the land-based network to the base station via the BSC and transmitted from the base station to the subscriber unit on a downlink.

Figure 1:
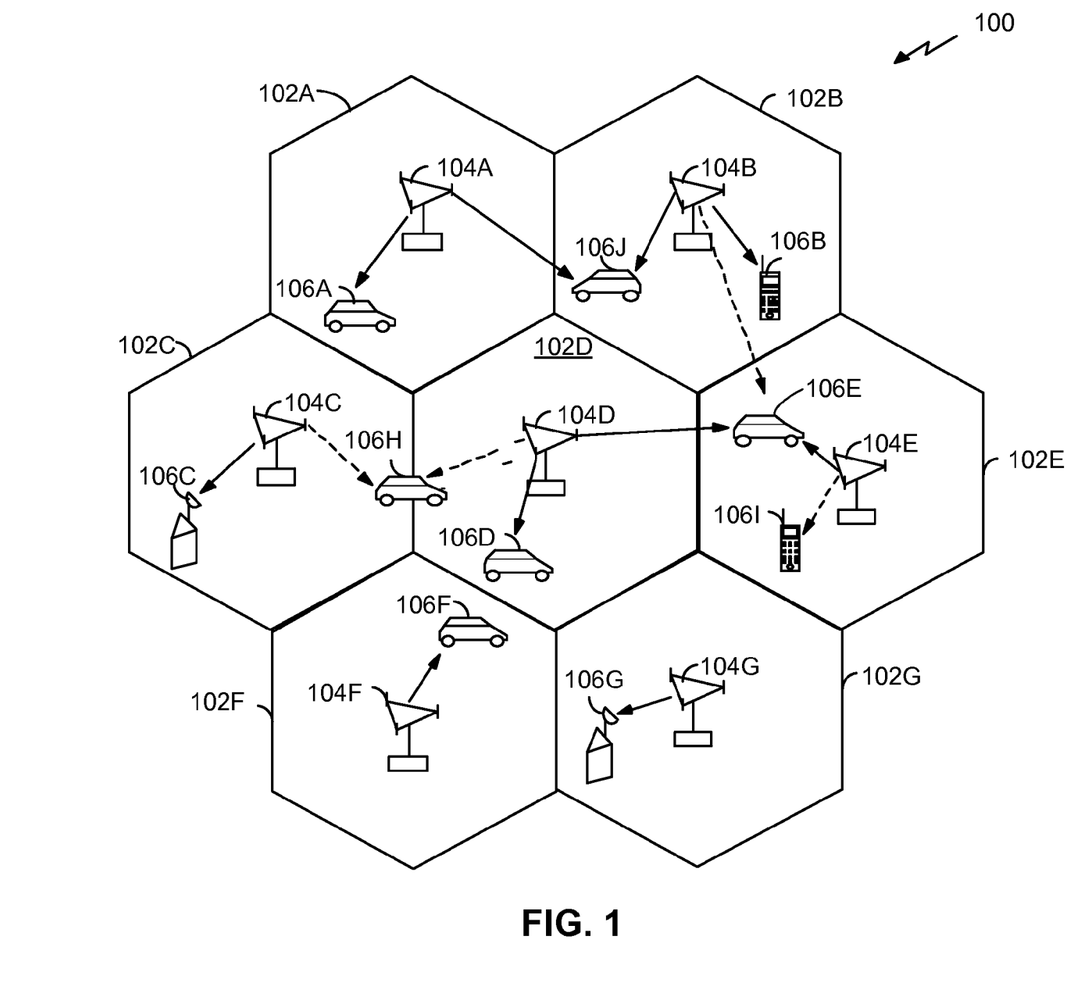
FIG. 1 is a diagram of a spread spectrum communication system that supports a number of users.

FIG. 1 serves as an example of a communications system 100 that supports a number of users and is capable of implementing at least some aspects of the embodiments discussed herein. Any of a variety of algorithms and methods may be used to schedule transmissions in system 100. System 100 provides communication for a number of cells 102A-102G, each of which is serviced by a corresponding base station 104A-104G, respectively. In the present embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and System for Providing a Soft Handoff in a CDMA Cellular Telephone System", which is assigned to the assignee of the present invention.

The downlink refers to transmission from the base station 104 to the terminal 106, and the uplink refers to transmission from the terminal 106 to the base station 104. In the present embodiment, some of the terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Figure 2:
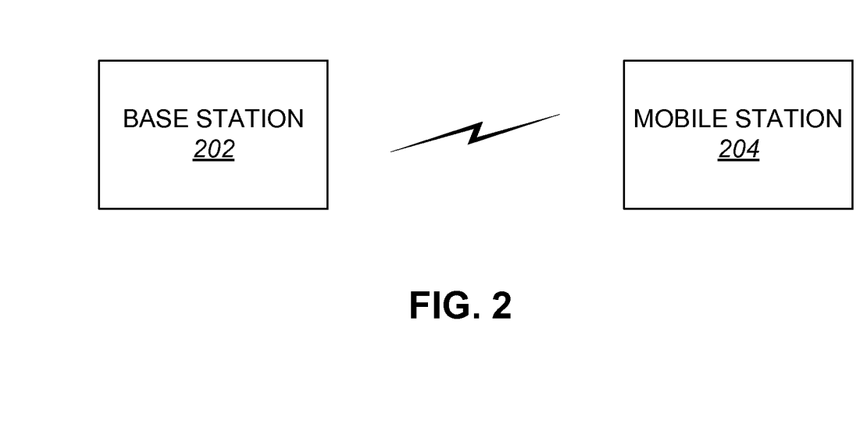
FIG. 2 is a block diagram of a base station and a mobile station in a communications system.

FIG. 2 is a block diagram of the base station 202 and mobile station 204 in a communications system 100. The base station 202 is in wireless communication with the mobile station 204. As mentioned above, the base station 202 transmits signals to mobile stations 204 that receive the signals. In addition, mobile stations 204 may also transmit signals to the base station 202.

Figure 3:
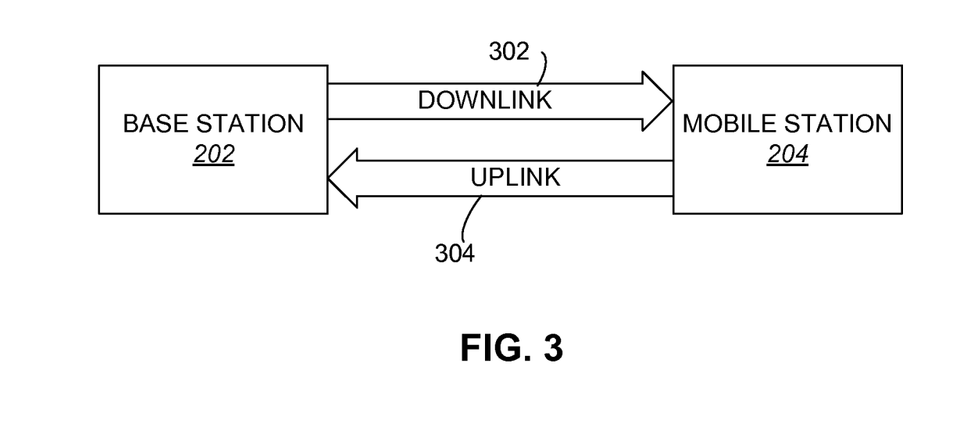
FIG. 3 is a block diagram illustrating the downlink and the uplink between the base station and the mobile station.

FIG. 3 is a block diagram of the base station 202 and mobile station 204 illustrating the downlink 302 and the uplink 304. The downlink 302 refers to transmissions from the base station 202 to the mobile station 204, and the uplink 304 refers to transmissions from the mobile station 204 to the base station 202.

Figure 4:
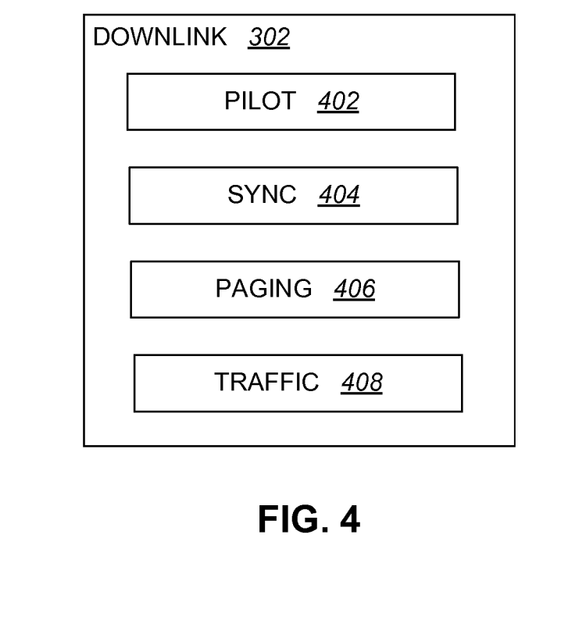
FIG. 4 is a block diagram of the channels in an embodiment of the downlink.

FIG. 4 is a block diagram of the channels in an embodiment of the downlink 302. The downlink 302 includes the pilot channel 402, the sync channel 404, the paging channel 406 and the traffic channel 408. The downlink 302 illustrated is only one possible embodiment of a downlink 302 and it will be appreciated that other channels may be added or removed from the downlink 302.

Under one CDMA standard, described in the Telecommunications Industry Association's "TIA/EIA/IS-95-A Mobile Stations-Base Station Compatibility Standard for Dual-Mode Wideband Spread Spectrum Cellular System," each base station 202 transmits pilot 402, sync 404, paging 406 and forward traffic 408 channels to its users. The pilot channel 402 is an unmodulated, direct-sequence spread spectrum signal transmitted continuously by each base station 202. The pilot channel 402 allows each user to acquire the timing of the channels transmitted by the base station 202, and provides a phase reference for coherent demodulation. The pilot channel 402 also provides a means for signal strength comparisons between base stations 202 to determine when to hand off between base stations 202 (such as when moving between cells 102).

The sync channel 404 conveys timing and system configuration information to the mobile station 204. The paging channel 406 is used to communicate with mobile stations 204 when they are not assigned to a traffic channel 408. The paging channel 406 is used to convey pages, that is, notifications of incoming calls, to the mobile stations 204. The traffic channel 408 is used to transmit user data and voice. Signaling messages are also sent over the traffic channel 408.

Figure 5:
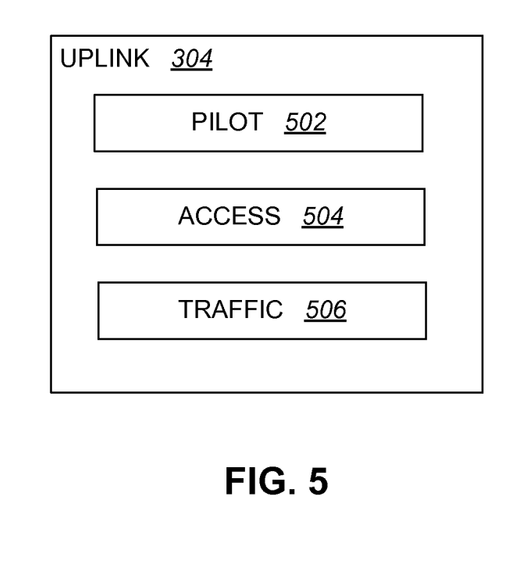
FIG. 5 is a block diagram of the channels in an embodiment of the uplink.

FIG. 5 is a block diagram of the channels in an embodiment of the uplink 304. The uplink 304 may include a pilot channel 502, an access channel 504 and a traffic channel 506. The uplink 304 illustrated is only one possible embodiment of an uplink and it will be appreciated that other channels may be added or removed from the uplink 304.

The uplink 304 of FIG. 5 includes a pilot channel 502. Recall that third-generation (3G) wireless radiotelephone communication systems have been proposed in which an uplink 304 pilot channel 502 is used. For example, in the currently proposed cdma2000 standard, the mobile station 204 transmits a Reverse Link Pilot Channel (R-PICH) that the base station 202 uses for initial acquisition, time tracking, rake-receiver coherent reference recovery, and power control measurements. Thus, systems and methods herein are applicable to pilot signals on the downlink 302 and on the uplink 304.

The access channel 504 is used by the mobile station 204 to communicate with the base station 202 when the mobile 204 does not have a traffic channel 506 assigned. The uplink traffic channel 506 is used to transmit user data and voice. Signaling messages are also sent over the uplink traffic channel 506.

Figure 6:
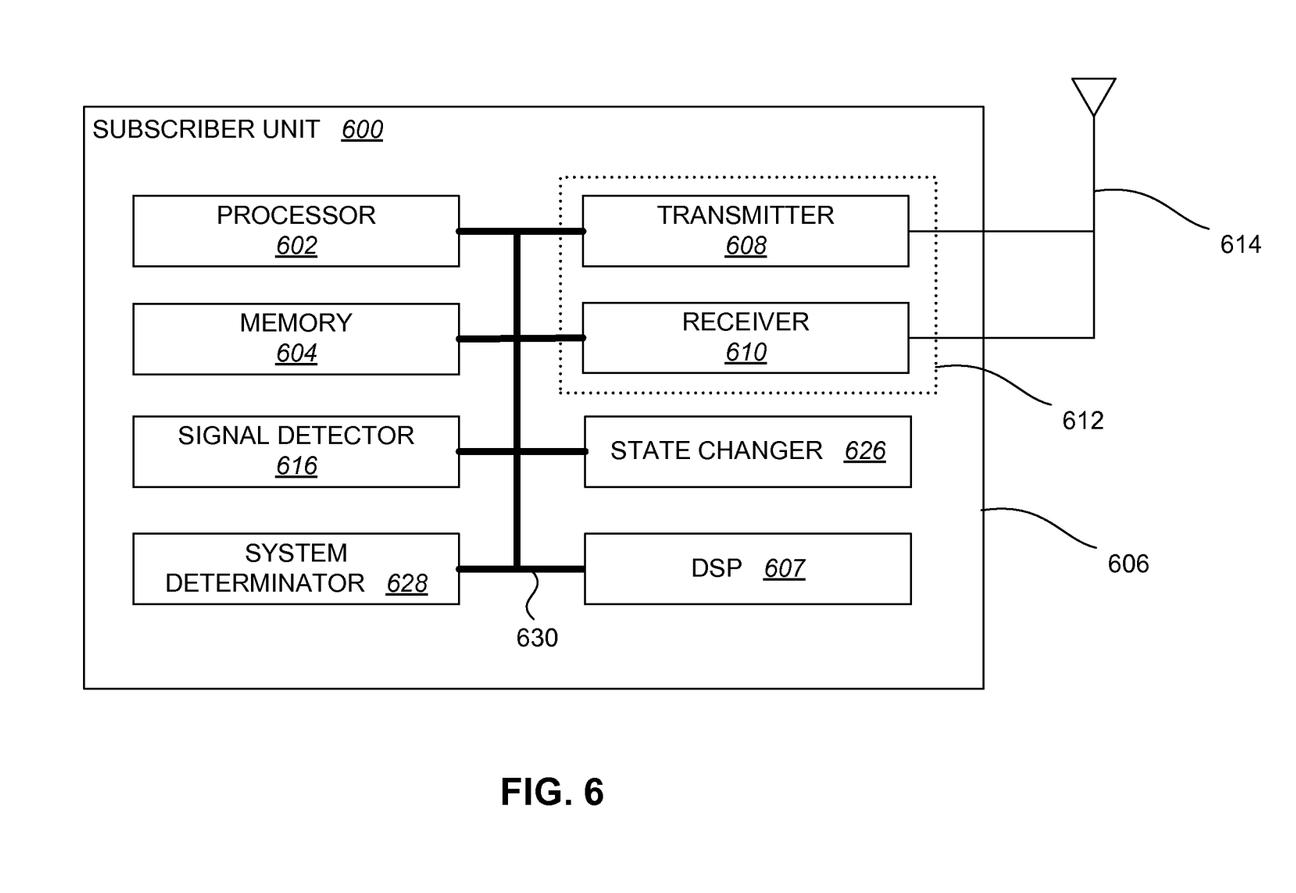
FIG. 6 is a block diagram of an embodiment of a subscriber unit.

An embodiment of a mobile station 204 is shown in a subscriber unit system 600 illustrated in the functional block diagram of FIG. 6. The system 600 includes a processor 602, which controls operation of the system 600. The processor 602 may also be referred to as a Central Processing Unit (CPU). Memory 604, which may include both read-only memory (ROM) and random access memory (RAM), provides instructions and data to the processor 602. A portion of the memory 604 may also include non-volatile random access memory (NVRAM).

The system 600, which is typically embodied in a wireless communication device such as a cellular telephone, also includes a housing 606 that contains a transmitter 608 and a receiver 610 to allow transmission and reception of data, such as audio communications, between the system 600 and a remote location, such as a cell site controller or base station 202. The transmitter 608 and receiver 610 may be combined into a transceiver 612. An antenna 614 is attached to the housing 606 and electrically coupled to the transceiver 612. Additional antennas (not shown) may also be used. The operation of the transmitter 608, receiver 610 and antenna 614 is well known in the art and need not be described herein.

The system 600 also includes a signal detector 616 used to detect and quantify the level of signals received by the transceiver 612. The signal detector 616 detects such signals as total energy, pilot energy per Pseudorandom Noise (PN) chips, power spectral density, and other signals, as is known in the art.

A state changer 626 of the system 600 controls the state of the wireless communication device based on a current state and additional signals received by the transceiver 612 and detected by the signal detector 616. The wireless communication device is capable of operating in any one of a number of states.

The system 600 also includes a system determinator 628 used to control the wireless communication device and determine which service provider system the wireless communication device should transfer to when it determines the current service provider system is inadequate.

The various components of the system 600 are coupled together by a bus system 630 which may include a power bus, a control signal bus, and a status signal bus in addition to a data bus. However, for the sake of clarity, the various busses are illustrated in FIG. 6 as the bus system 630. The system 600 may also include a Digital Signal Processor (DSP) 607 for use in processing signals. One skilled in the art will appreciate that the system 600 illustrated in FIG. 6 is a functional block diagram rather than a listing of specific components.

The methods disclosed herein for using an adaptive equalizer in a communication receiver may be implemented in an embodiment of a subscriber unit 600. The disclosed systems and methods may also be implemented in other communication systems with a receiver, such as a base station 202. If a base station 202 is being used to implement the disclosed systems and methods, the functional block diagram of FIG. 6 may also be used to describe components in a functional block diagram of a base station 202.

Figure 7:
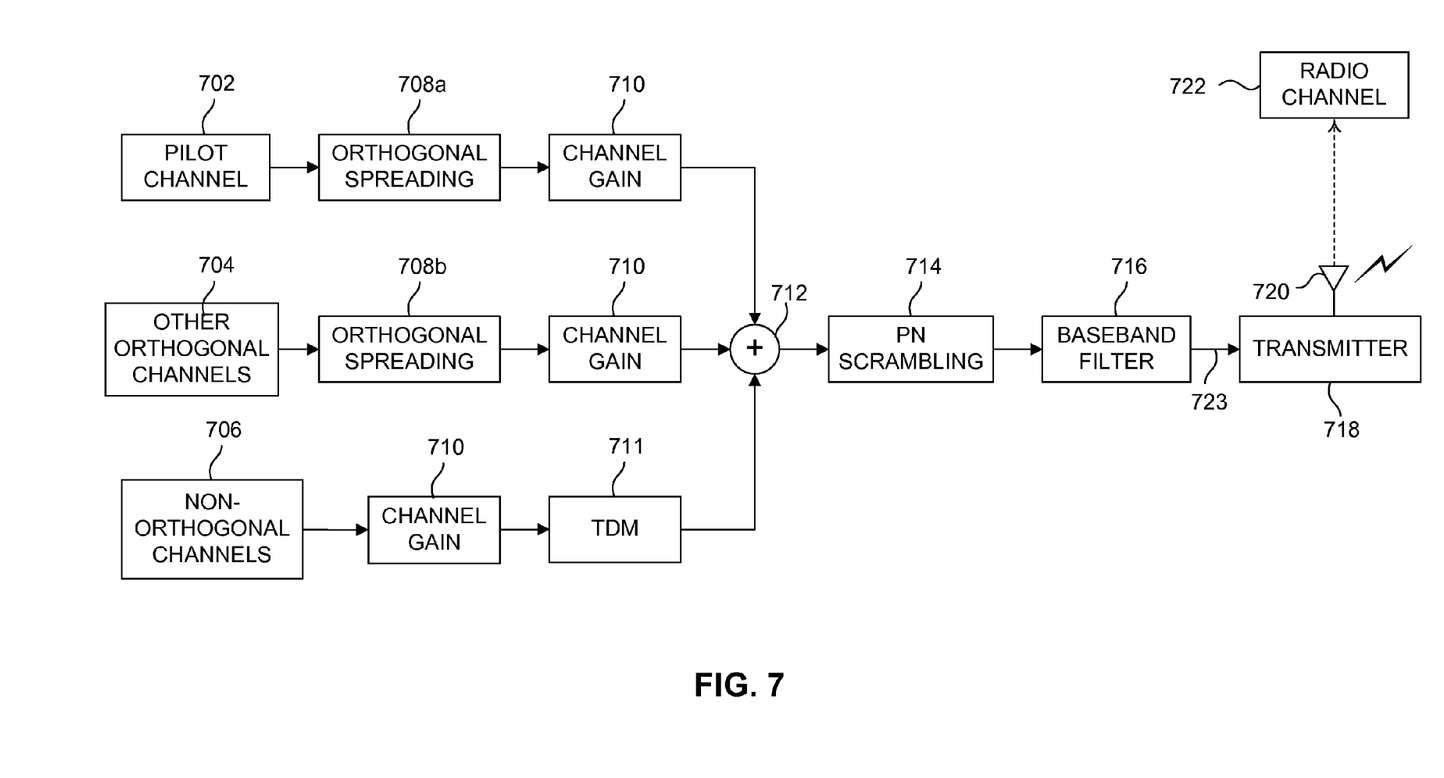
FIG. 7 is a functional block diagram illustrating the transmission of a wireless signal.

FIG. 7 is a functional block diagram illustrating the transmission of a wireless signal. As shown, the wireless signal includes a pilot channel 702 and other orthogonal channels 704. Additional non-orthogonal channels 706 may also be included in the wireless signal. Non-orthogonal channels 706 are not used in CDMA2000. One example of a non-orthogonal channel is the sync channel (SCH) in WCDMA.

The orthogonal channels are provided to an orthogonal spreading component 708. Both the orthogonal and non-orthogonal channels are then provided to a channel gain component 710, which adds a gain for the channel. The outputs from the channel gain components 710 are summed together as shown by the summer 712. As shown in FIG. 7, the non-orthogonal channel may be time-division multiplexed (TDM) 711. In other embodiments, one or more of the orthogonal channels may be time-division multiplexed.

The non-orthogonal channels 706 do not have orthogonal spreading components but are fed directly into the channel gain component 710. The output of the channel gain 710 is summed with the summer 712.

The summed signal is fed into the PN scrambling component 714. A baseband filter 716 takes the output from the PN scrambling component 714 and provides the filtered output 723 to a transmitter 718. The transmitter 718 includes an antenna 720. The wireless signal then enters the radio channel 722.

The functional block diagram of FIG. 7 illustrating the transmission of a wireless signal may be implemented in various components. For example, the base station 202 embodies one form of the block diagram illustrated in FIG. 7. In addition, the mobile station 204 also implements a form of the transmission block diagram.

Figure 8:
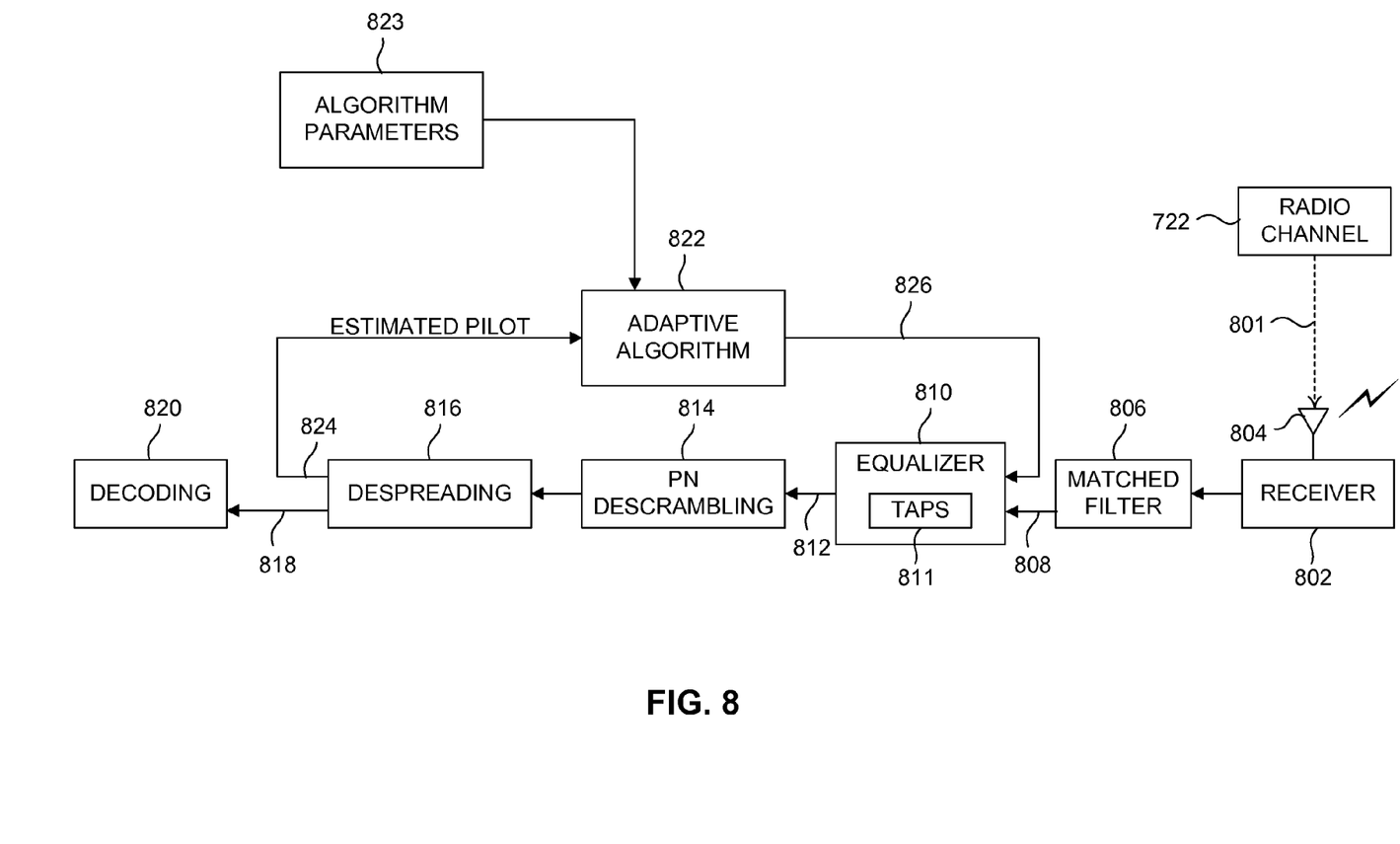
FIG. 8 is a functional block diagram illustrating the reception of a wireless signal.

FIG. 8 is a functional block diagram illustrating the reception of a wireless signal 801. A receiver 802 receives the wireless signal 801 through the use of an antenna 804. The received signal contains a distorted version of the transmitted pilot channel. The received signal is fed into a matched filter 806 that is matched to the impulse response of the baseband filter in the transmitter. The output 808 of the matched filter 806 is provided to an equalizer 810. The signal output 808 from the matched filter 806 still includes all the different channels in the output 808 that were transmitted.

The equalizer 810 corrects for distortions and generates an estimate of the transmitted signal. The equalizer 810 also handles time-varying channel conditions. The equalizer 810 includes a filter implemented through use of a number of equalizer taps 811. The taps may be equispaced or non-equispaced.

The equalizer output 812 is provided to the PN descrambling 814 and despreading 816 components. It will be appreciated by those skilled in the art that the pilot channel 702 and the other channels 704 are also output from the despreading component 816. The despreading component 816 extracts the pilot channel 702 and the other channels and provides separate estimates for the pilot channel and other channels. The various channels are then decoded by a decoding component 820.

An adaptive algorithm component 822 adapts the equalizer 810. The estimated pilot 824 is provided by the despreading component 816 to the adaptive algorithm component 822. The adaptive algorithm component 822 has a-priori knowledge of the transmitted pilot channel. In wireless communication systems, it is common to transmit a sequence of a-priori known symbols on the pilot channel. The estimated pilot 824 input to the adaptive algorithm component 822 may be a code division multiplexed (CDM) pilot. The adaptive algorithm 822 updates the taps 811 while the receiver 802 is receiving a wireless signal that includes a traffic channel (during traffic). Thus, although in other systems currently in use, adaptive equalizers adapt before traffic, the systems and methods disclosed herein train and adapt during traffic.

Additional algorithm parameters 823 may be provided to the adaptive algorithm component 822. The known reference signal may be part of the algorithm parameters 823 that are provided to the adaptive algorithm component 822. An adaptation step size may also be included as part of the algorithm parameters 823. Depending on the specific algorithm being used, the algorithm parameters 823 will vary as will be appreciated by those skilled in the art.

As will be discussed further below, the adaptive algorithm component 822 continues to adapt the equalizer 810 to provide an estimate of the transmitted signal and to enable the equalizer 810 to change as needed. The adaptive algorithm component 822 updates the equalizer filter weights 826 that are used by the equalizer 810. The weights 826 correspond to the equalizer taps 811.

Referring to FIGS. 7 and 8, the following provides a mathematical description and background of various signals, formulas and algorithms that may be used.

The complex baseband analog signal 723 to be transmitted from the baseband filter 716 in FIG. 7 may be written as shown in Formula 1. The formula shown in Formula 1 does not include a noise component. The variables and parameters in Formula 1 are given in Table 1. Regarding Table 1, OVSF stands for orthogonal variable spreading factor. OVSF codes are also referred to as Walsh codes.

$$= \sum_{u=0}^{N-1} \sum_{n=-\infty}^{+\infty} g_u[k] \cdot W_u^N[n \bmod N] \cdot d_u[k] \cdot PN[n] \cdot h(t - nT_c). \quad \text{Formula 1}$$

TABLE 1

| | | |
|---|---|---|
| n | = | Chip index |
| N | = | OVSF spread factor |
| k | = | $\left\lfloor \frac{n}{N} \right\rfloor$ |
| $T_c$ | = | Chip period |
| $g_u[k]$ | = | Digital gain for code u at chip n |
| $W_u^N[n \bmod N]$ | = | Orthogonal code u length N chips with chip index (n mod N) |
| $d_u[k]$ | = | Complex data symbol for code u at chip n |
| | = | $d_u^{(I)}[k] + j \cdot d_u^{(Q)}[k]$ |
| PN[n] | = | Complex PN chip at index n |
| | = | $PN^{(I)}[n] + j \cdot PN^{(Q)}[n]$ |
| h(t) | = | Baseband Tx filter |
| $\int_{-\infty}^{\infty} h^2(t) \cdot dt$ | = | 1 |

A function for the real attenuation of path i is shown in Formula 2. The propagation delay of path i is shown in Formula 3. The complex attenuation of path i is shown in Formula 4. In Formula 4, the term $f_c$ is the carrier frequency. The parameter $d_0$ is the nominal distance. The term C is the velocity of light.

$$a_i(t) \quad \text{Formula 2}$$

$$\tau_i(t) \quad \text{Formula 3}$$

$$\alpha_i(t) = a_i(t) \cdot e^{-j2\pi f_c d_0/c} \quad \text{Formula 4}$$

Assumptions may be made to simplify and/or to accomplish the necessary calculations. Quasi-static fading is assumed over the equalizer adaptation period. An over-sampling factor of Ω is also assumed. The propagation delay of path i may be expressed as shown in Formula 5. A ceiling function may be used for $\lambda_i$ as shown in Formula 6. The term $T_c$ in Formula 6 is the chip period. The ceiling function used for $\lambda_i$ in Formula 6 may easily be substituted with the floor function without any loss of generality.

Referring to the matched filter 806 of FIG. 8, typically match filtering is done at Chip×8 ("C×8"), with a C×4 receive buffer. The C×4 samples are interpolated to C×8 for time tracking (using an early-late delay-locked loop), while the on-time samples are used for frequency tracking. For the equation found in Formula 7, it is assumed that matched filtering is done at C×Ω. The output 808 of the matched filter 806 may be expressed as shown in Formula 7. The expression of $X_l[m]$ in Formula 7 represents the digital samples at C×Ω after matching filtering and also represents the input samples to the equalizer 810. The variables and parameters in Formula 7 are given in Table 2. Regarding Formula 7 and Table 2, the signal timing needs to be offset by the path delays. This is termed as the equalizer time offset. The pulse shaping filter mentioned in Table 2 is sometimes referred to as the baseband transmit filter.

$$\tau_i(t) \approx \tau_i. \qquad \text{Formula 5}$$

$$\lambda_i = \left\lceil \frac{\Omega \cdot \tau_i}{T_c} \right\rceil. \qquad \text{Formula 6}$$

$$= \sum_{i=0}^{P-1} \alpha_i \cdot \sum_{u=0}^{N-1} \sum_{n=-\infty}^{+\infty} d_u[k] \cdot W_u^N[n \bmod N] \cdot PN[n] \cdot \qquad \text{Formula 7}$$

$$p_{OS}[m - n\Omega - \lambda_i] + w[m].$$

TABLE 2

| | |
|---|---|
| $p_{os}[\cdot] =$ | Auto-correlation of the pulse shaping filter at C × Ω |
| w[m] = | Noise |
| $x_l[m] =$ | Digital samples at C × Ω after match filtering |
| = | Input samples to the equalizer |
| $d_u[k] =$ | Contains the digital gain $g_u[k]$ for simplicity |

Both the IS-95 and WCDMA baseband transmit filters have excess bandwidth. To avoid aliasing, the equalizer input is at CxQ, while the equalizer taps 811 are fractionally spaced relative to the chip period (FSE). The equalizer output is at C×1. For purposes of illustration, the number of equalizer taps 811 is assumed to be 2F+1 at C×Ω, where F is any non-negative integer.

The input to the FSE is defined as follows. The term λ* is defined as the timing offset (using the finger front-end of a rake receiver). Additional inputs to the FSE are defined in Formulas 8 and 9. Referring again to FIG. 8, with the inputs to the FSE thus defined, the equalized signal 812 at C×1 is shown by Formula 10. The matrix notation for $\chi_e$ is shown in Formula 11. Definitions for the variables and parameters in Formulas 8-9 are given in Table 3.

$$x_1[-b; n] = x_1[\Omega N - b; n - 1]. \qquad \text{Formula 8}$$

$$x_1[\Omega N + b - 1; n] = x_1[b; n + 1]. \qquad \text{Formula 9}$$

$$; n] = \sum_{k=-F}^{F} e[k] \cdot x_l[\Omega m - k + \lambda^*; n]. \qquad \text{Formula 10}$$

$$\Rightarrow x_e[n] = X[n] \cdot e. \qquad \text{Formula 11}$$

TABLE 3

| | |
|---|---|
| e = | (2F + 1) × 1 equalizer tap vector |
| X[n] = | N × (2F + 1) matrix |
| $x_e[n] =$ | N × 1 complex vector |

The desired signal being output 824 by the orthogonal despreading component 816 is r[0;n]=1, which corresponds to the common pilot. This output 824 from the orthogonal despreading component 816 is input into the adaptive algorithm component 822 that adapts the equalizer 810. As mentioned above, the input 824 to the adaptive algorithm 822 is a CDM pilot.

Various adaptive algorithms may be used to adapt the equalizer 810 taps 811. An iterative algorithm may be used to adapt the equalizer. Various different iterative algorithms may be used. One possible algorithm that may be used is the Least Mean Square (LMS) algorithm. Another possible algorithm that may be used is the Recursive Least Squares (RLS) algorithm. A Kalman filter may also be used. Non-iterative algorithms may also be used. Those skilled in the art will appreciate that other adaptive algorithms may also be used to adapt the equalizer 810 taps 811.

Figure 9:
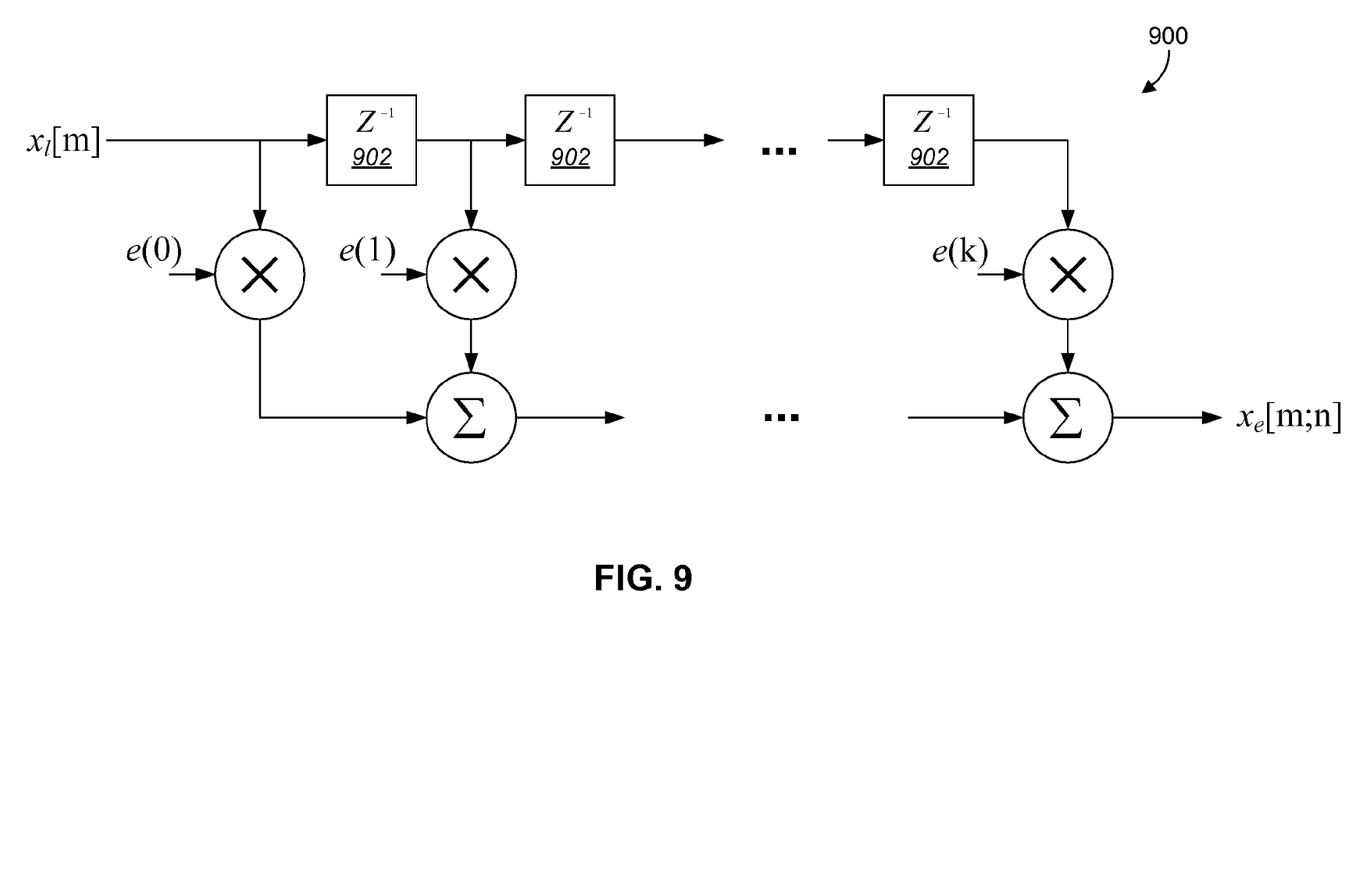
FIG. 9 is a block diagram illustrating an implementation of a FIR filter.

In one embodiment, the equalizer 810 may be implemented by a Finite Impulse Response (FIR) filter. FIG. 9 is a block diagram illustrating an implementation of an FIR filter 900. As shown, the input to the filter is $\chi_l$ and the output is $\chi_e$. The input $\chi_l$ includes the present input sample as well as past samples, as indicated by the delay blocks 902. The output may be calculated according to the equation shown in Formula 10. The equation of Formula 10 may be written in matrix form as shown in Formula 11.

Other components may be used within the equalizer 810 besides a FIR filter. For example, an Infinite Impulse Response (IIR) may be used. In addition, the filtering may be performed in the frequency domain.

Figure 10:
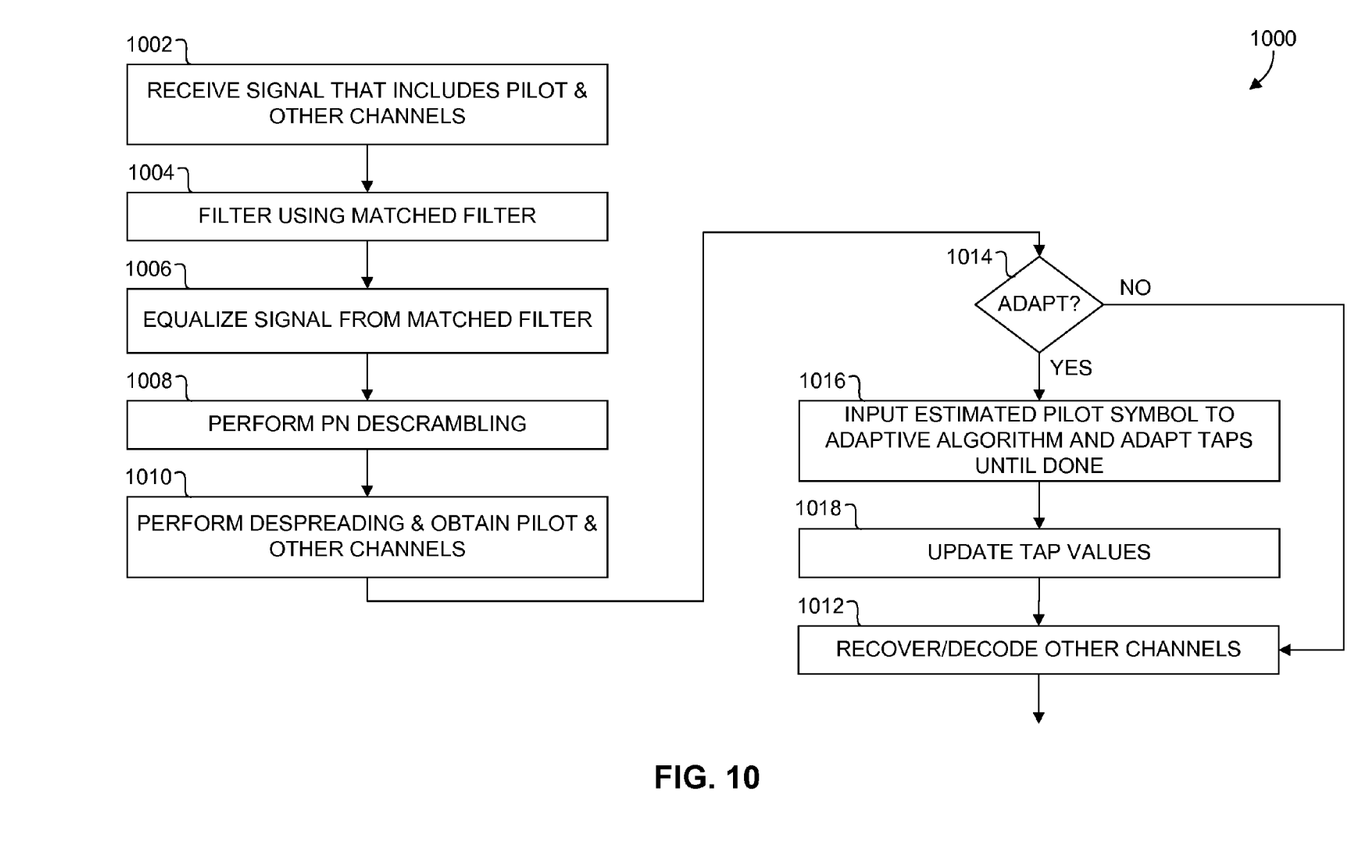
FIG. 10 is a flow diagram of a method for using an adaptive equalizer when receiving a wireless signal by a mobile station.

FIG. 10 is a flow diagram of a method 1000 for using an adaptive equalizer 810 when receiving a wireless signal by a mobile station 204. The method of FIG. 10 may also be used by a base station 202 and other types of receivers in a wireless communication system 100. A wireless signal is received 1002 that includes a pilot 402 and other channels. The other channels may include a variety of channels including, but not limited to, traffic 408, sync 404 and paging 406 channels. Other channels may also be included in the received wireless signal. The pilot and other channels may be transmitted continuously. In addition, the pilot and other channels may not be transmitted continuously. In addition, if the method 1000 were being implemented by a base station 202, fewer channels would be included. For example, if the wireless signal were being received by a base station 202, the wireless signal may include a pilot, traffic and access channels. As shown, the method 1000 may easily be adapted for use in various receivers in wireless communication systems 100.

The received signal is filtered 1004 using the matched filter 806. The output 808 of the matched filter 806 is provided to an equalizer 810 for equalization 1006. As stated earlier, the equalizer 810 corrects for distortions and generates an estimate of the transmitted signal and also handles time-varying channel conditions.

The equalizer 810 includes a filter implemented through use of a number of taps 811 represented by e herein. The equalizer 810 loads the current values of the taps 811 in order to implement the filter. If the equalizer taps 811 are updated, the equalizer 810 may use the updated values of the taps 811. Those skilled in the art will appreciate the various ways in which the equalizer 810 may be made aware of new values of the taps 811 being available.

The equalizer output 812 is provided to the PN descrambling component 814 wherein PN descrambling is performed 1008. Then despreading is performed 1010 to obtain estimates for the pilot and other channels.

The steps in FIG. 10 may be performed continually while the method 1000 is in operation. Thus, the method 1000 may continue to receive 1002 the wireless signal, may continue to filter 1004 using the matched filter 806 and may perform the remaining steps shown 1006, 1008, 1010 and 1012 in the main processing loop in parallel.

As shown in FIG. 8, the adaptive algorithm 822 takes the estimated pilot from the despreading component 816 and uses it in the adaptive process. A determination 1014 is made as to whether the equalizer 810 should be updated/adapted. Different settings may be made for adapting the equalizer 810. For example, the method may be configured to adapt the equalizer taps 811 every pilot symbol interval. Alternatively, the method may be configured to adapt the equalizer taps 811 once every Nth pilot symbol interval, where N is a positive integer. The value of N may be static or it may be dynamic. The method may be configured to adapt the equalizer taps 811 multiple times every pilot symbol interval. It will be appreciated by those skilled in the art that, depending on the environment, it may be necessary to adapt the equalizer taps 811 more or less frequently. For example, in low velocity situations, the taps 811 may not need to be adapted and updated as often as when the system is being used in high velocity situations.

If it is determined 1014 that the equalizer taps 811 should be adapted/updated, the pilot symbol is input 1016 into the adaptive algorithm 822 until the adaptive algorithm 822 has completed. Various methods may be used to determine when the adaptive algorithm 822 is to discontinue operating. For example, the adaptive algorithm 822 may operate until the taps 811 have converged. Alternatively, the adaptive algorithm 822 may operate for a certain period of time. Furthermore, the adaptive algorithm 822 may start adaptation when channel conditions change. Those skilled in the art will appreciate that other methods may be used to determine when the adaptive algorithm 822 is to discontinue operating. Once the adaptive algorithm 822 is done, the tap values 811 are updated 1018. The other channel(s) are then recovered or decoded 1012.

If the pilot channel 702 were being sent on the uplink 304, the components illustrated may be used in a base station 202 to estimate the pilot channel. It is to be understood that the inventive principles herein may be used with a variety of components to estimate a pilot whether the pilot is being received by a mobile station 204, a base station 202, or any other component in a wireless communications system 100. Thus, the embodiment of a mobile station 204 is a present embodiment of the systems and methods but it is understood that the systems and methods may be used in a variety of other contexts.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for use in a wireless communication system wherein the apparatus estimates a transmitted signal, the apparatus comprising:
at least one antenna coupled to a receiver for receiving a wireless signal that comprises a pilot channel and at least one other channel;
a matched filter for matched filtering with a not oversampled input rate and then oversampling the wireless signal to provide an oversampled filtered wireless signal;
a fractionally spaced equalizer for estimating the transmitted signal using the oversampled filtered wireless signal, wherein the fractionally spaced equalizer includes a filter with a plurality of taps that may be adjusted through use of an adaptive algorithm that uses an estimated pilot estimated from the received wireless signal, wherein the plurality of taps are adjusted through the adaptive algorithm every Nth pilot symbol interval, where N is a positive integer, wherein the value of N is changed based on a velocity of a device in the wireless communication system, and wherein the pilot channel was transmitted with the at least one other channel; and
a component to extract the estimated pilot and to provide the estimated pilot to the adaptive algorithm, wherein the fractionally spaced equalizer is further configured for adjusting the plurality of taps through use of the adaptive algorithm, the adaptive algorithm performing adaptation when channel conditions have changed such that the fractionally spaced equalizer does not match current channel conditions.

2. The apparatus as defined in claim 1, wherein the adaptive algorithm is an iterative algorithm.

3. The apparatus as defined in claim 1, wherein the fractionally spaced equalizer comprises a Finite Impulse Response (FIR) filter.

4. The apparatus as defined in claim 1, wherein the fractionally spaced equalizer comprises an Infinite Impulse Response filter.

5. The apparatus as defined in claim 1, wherein filtering is performed in the frequency domain.

6. The apparatus as defined in claim 1, wherein the adaptive algorithm updates the taps once every pilot symbol interval.

7. The apparatus as defined in claim 1, wherein the adaptive algorithm continues to adapt new tap values until the new tap values converge.

8. The apparatus as defined in claim 1, wherein the pilot channel is code division multiplexed.

9. The apparatus of as defined in claim 1, wherein the fractionally spaced equalizer is further configured for adjusting the plurality of taps through the use of the adaptive algorithm using a-priori knowledge of the pilot channel.

10. The apparatus of as defined in claim 1, wherein the fractionally spaced equalizer is further configured for adjusting an adaptation step size of the equalizer.

11. The apparatus of as defined in claim 1, wherein the at least one other channel includes at least one non-orthogonal channel.

12. The apparatus of as defined in claim 11, wherein the non-orthogonal channel is a sync channel.

13. The apparatus of as defined in claim 1, wherein the pilot channel and the at least one other channel are received non-simultaneously.

14. The apparatus of as defined in claim 1, wherein the fractionally spaced equalizer is further configured for adjusting the plurality of taps only until the plurality of taps have converged.

15. The apparatus of as defined in claim 1, wherein the fractionally spaced equalizer is further configured for adjusting the plurality of taps differentially in accordance with multiple estimates of a pilot signal taken at distinct times.

16. A method for estimating a transmitted signal in a wireless communication system, the method comprising the steps of:
receiving a wireless signal that comprises a pilot channel and at least one other channel;
matched filtering with a not oversampled input rate and then oversampling the wireless signal to provide an oversampled filtered wireless signal;
estimating a transmitted signal using a fractionally spaced equalizer and the oversampled filtered wireless signal, wherein the fractionally spaced equalizer includes a filter with a plurality of taps that may be adjusted through use of an adaptive algorithm that uses an estimated pilot estimated from the received wireless signal, wherein the plurality of taps are adjusted through the adaptive algorithm every Nth pilot symbol interval, where N is a positive integer, wherein the value of N is changed based on a velocity of a device in the wireless communication system, and wherein the pilot channel was transmitted with the at least one other channel;
extracting the estimated pilot;
providing the estimated pilot to the adaptive algorithm;
adjusting the plurality of taps through use of the adaptive algorithm; and
performing adaptation with the adaptive algorithm when channel conditions have changed such that the fractionally spaced equalizer does not match current channel conditions.

17. The method as defined in claim 16, wherein the adaptive algorithm is an iterative algorithm.

18. The method as defined in claim 16, wherein the pilot channel is a code division multiplexed.

19. The method as defined in claim 18, wherein the wireless signal further comprises orthogonal and non-orthogonal channels.

20. The method as defined in claim 18, wherein the method is implemented by a mobile station.

21. The method as defined in claim 18, wherein the method is implemented by a base station.

22. The method as defined in claim 16, wherein the fractionally spaced equalizer comprises a Finite Impulse Response (FIR) filter.

23. The method as defined in claim 16, wherein the fractionally spaced equalizer comprises an Infinite Impulse Response (IIR) filter.

24. The method as defined in claim 16, wherein filtering is performed in the frequency domain.

25. The method as defined in claim 16, wherein the adaptive algorithm is used once every pilot symbol interval to update the taps.

26. The method as defined in claim 16, wherein the adaptive algorithm continues to adapt new tap values until the new tap values converge.

27. The method as defined in claim 16, wherein the adaptive algorithm continues to adapt new tap values for a time period.

28. An apparatus for use in a wireless communication system, the apparatus comprising:
- means for receiving a wireless signal that comprises a pilot channel and at least one other channel;
- means for matched filtering with a not oversampled input rate and then oversampling the wireless signal to provide an oversampled filtered wireless signal;
- means for estimating a transmitted signal using a fractionally spaced equalizer and the oversampled filtered wireless signal, wherein the fractionally spaced equalizer includes a filter with a plurality of taps that may be adjusted through use of an adaptive algorithm that uses an estimated pilot estimated from the received wireless signal, wherein the plurality of taps are adjusted through the adaptive algorithm every Nth pilot symbol interval, where N is a positive integer, wherein the value of N is changed based on a velocity of a device in the wireless communication system, and wherein the pilot channel was transmitted with the at least one other channel;
- means for extracting the estimated pilot;
- means for providing the estimated pilot to the adaptive algorithm;
- means for adjusting the plurality of taps through use of the adaptive algorithm; and
- means for performing adaptation with the adaptive algorithm when channel conditions have changed such that the fractionally spaced equalizer does not match current channel conditions.

29. A non-transitory computer-readable medium comprising code that, when executed, causes a computer to perform the following:
- receiving a wireless signal that comprises a pilot channel and at least one other channel;
- matched filtering with a not oversampled input rate and then oversampling the wireless signal to provide an oversampled filtered wireless signal;
- estimating a transmitted signal using a fractionally spaced equalizer and the oversampled filtered wireless signal, wherein the fractionally spaced equalizer includes a filter with a plurality of taps that may be adjusted through use of an adaptive algorithm that uses an estimated pilot estimated from the received wireless signal, wherein the plurality of taps are adjusted through the adaptive algorithm every Nth pilot symbol interval, where N is a positive integer, wherein the value of N is changed based on a velocity of a device in the wireless communication system, and wherein the pilot channel was transmitted with the at least one other channel;
- extracting the estimated pilot;
- providing the estimated pilot to the adaptive algorithm;
- adjusting the plurality of taps through use of the adaptive algorithm; and
- performing adaptation with the adaptive algorithm when channel conditions have changed such that the fractionally spaced equalizer does not match current channel conditions.

* * * * *